US009379964B2

(12) United States Patent
Chen et al.

(10) Patent No.: US 9,379,964 B2
(45) Date of Patent: Jun. 28, 2016

(54) DISCOVERING A TOPOLOGY—TRANSPARENT ZONE

(71) Applicant: Futurewei Technologies, Inc., Plano, TX (US)

(72) Inventors: Huaimo Chen, Bolton, MA (US); Renwei Li, Fremont, CA (US)

(73) Assignee: Futurewei Technologies, Inc., Plano, TX (US)

( * ) Notice: Subject to any disclaimer, the term of this patent is extended or adjusted under 35 U.S.C. 154(b) by 116 days.

(21) Appl. No.: 14/203,177

(22) Filed: Mar. 10, 2014

(65) Prior Publication Data

US 2014/0254427 A1    Sep. 11, 2014

Related U.S. Application Data

(60) Provisional application No. 61/776,165, filed on Mar. 11, 2013.

(51) Int. Cl.
*H04L 12/28* (2006.01)
*H04L 12/751* (2013.01)

(52) U.S. Cl.
CPC ...................... *H04L 45/02* (2013.01)

(58) Field of Classification Search
CPC .............................. H04L 45/507; H04L 45/02
USPC .......................................................... 370/254
See application file for complete search history.

(56) References Cited

U.S. PATENT DOCUMENTS

| 2004/0190457 | A1* | 9/2004 | Mohr | H04L 41/12 370/241 |
| 2005/0047327 | A1* | 3/2005 | Saleh | H04L 45/02 370/221 |
| 2006/0023725 | A1* | 2/2006 | Makishima | H04Q 11/0005 370/398 |
| 2006/0056328 | A1* | 3/2006 | Lehane | H04L 45/02 370/315 |
| 2008/0056157 | A1* | 3/2008 | Retana | H04L 45/04 370/254 |
| 2012/0243443 | A1* | 9/2012 | Li | H04L 45/02 370/256 |

OTHER PUBLICATIONS

Chen, H., et al., "OSPF Topology—Transparent Zone", draft-chen-ospf-ttz-00.txt, Oct. 24, 2011, 40 pages.
Chen, H., et al., "OSPF Topology—Transparent Zone", draft-chen-ospf-ttz-01.txt, Mar. 12, 2012, 44 pages.
Chen, H., et al., "OSPF Topology—Transparent Zone", draft-chen-ospf-ttz-02.txt, Jul. 16, 2012, 40 pages.
Chen, H., et al., "OSPF Topology—Transparent Zone", draft-chen-ospf-ttz-03.txt, Oct. 20, 2012, 40 pages.

(Continued)

*Primary Examiner* — Gerald Smarth
(74) *Attorney, Agent, or Firm* — Conley Rose, P.C.; Grant Rodolph; Adam J. Stegge

(57) ABSTRACT

A network node used to discover a topology-transparent zone (TTZ). In one example embodiment, the network node may obtain a TTZ identifier (ID) that is uniquely associated with the TTZ. Additionally, the network node may identify a link connected to a second network node that is also assigned the TTZ ID. In response to the command to initiate discovering the TTZ, the network node may generate a router information (RI) link-state advertisement (LSA) that comprises the TTZ ID and may distribute the RI LSA to the second network node using the link. In another example embodiment, the network node may not be configured as a TTZ edge node and may receive an RI LSA comprising the TTZ ID. The network node may store at least a portion of the information within the RI LSA and may flood the RI LSA using a plurality of links.

19 Claims, 5 Drawing Sheets

(56) References Cited

OTHER PUBLICATIONS

Chen, H., et al., "OSPF Topology—Transparent Zone", draft-chen-ospf-ttz-04.txt, Feb. 25, 2013, 32 pages.
Chen, H., et al., "OSPF Topology—Transparent Zone", draft-chen-ospf-ttz-05.txt, May 4, 2013, 32 pages.
Chen, H., et al., "OSPF Topology—Transparent Zone", draft-chen-ospf-ttz-06.txt, Jul. 15, 2013, 32 pages.
Chen, H., et al., "OSPF Topology—Transparent Zone", draft-chen-ospf-ttz-07.txt, Jan. 16, 2014, 15 pages.
Bradner, S., "Key words for use in RFCs to Indicate Requirement Levels", RFC 2119, Mar. 1997, 6 pages.
Moy, J., "OSPF Version 2", RFC 2328, Apr. 1998, 244 pages.
Coltun, R., "The OSPF Opaque LSA Option", RFC 2370, Jul. 1998, 15 pages.
Coltun, R., et al., "OSPF for IPv6", RFC 2740, Dec. 1999, 160 pages.
Katz, D., et al., "Traffic Engineering (TE) Extensions to OSPF Version 2", RFC 3630, Sep. 2003, 14 pages.
Lindem, A., Ed., et al., "Extensions to OSPF for Advertising Optional Router Capabilities", RFC 4970, Jul. 2007, 26 pages.
Coltun, R., et al., "OSPF for IPv6", RFC 5340, Jul. 2008, 94 pages.
Vasseur, JP., Ed., et al., "Path Computation Element (PCE) Communication Protocol (PCEP)", RFC 5440, Mar. 2009, 174 pages.
Vasseur, JP., Ed., et al., "A Backward-Recursive PCE-Based Computation (BRPC) Procedure to Compute Shortest Constrained Inter-Domain Traffic Engineering Label Switched Paths", RFC 5441, Apr. 2009, 36 pages.
Aggarwal., R., et al., "Advertising a Router's Local Addresses in OSPF Traffic Engineering (TE) Extensions", RFC 5786, Mar. 2010, 7 pages.

* cited by examiner

DISCOVERING A TOPOLOGY—TRANSPARENT ZONE

CROSS-REFERENCE TO RELATED APPLICATIONS

The present application claims priority to U.S. Provisional Patent Application No. 61/776,165 filed Mar. 11, 2013 by Huaimo Chen et al., and entitled "Systems and Methods for Discovering TTZ," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

As Internet traffic continues to grow, the number of network nodes may also increase within a network. To manage the Internet traffic, the network may be extended by splitting the network into a plurality of areas. However, splitting the network for scalability and convergence may be challenging or may cause service issues, operation issues, and/or performance issues. For instance, dividing a network from one area into multiple areas or from a number of existing areas to more areas may be time consuming and also involve significant network architecture changes. Services carried by a network may also be interrupted while the network is being split into multiple areas. Further, setting up a multi-protocol label switching (MPLS) traffic engineering (TE) label switching path (LSP) that crosses multiple areas may be complex. In a conventional system, a TE path crossing multiple areas may be computed by using a path computation element (PCE) through the PCE Communication Protocol (PCEP). Such a conventional system may require manual configuration of a sequence of domains and may be difficult to configure by a network operator. Additionally, configuring the conventional system may require configuring area attributes and area border router (ABR) policies on every interface in the area, which may require complicated network operations.

SUMMARY

In one example embodiment, the disclosure includes a network node used to discover a topology-transparent zone (TTZ). The network node may obtain a TTZ identifier (ID) that is uniquely associated with the TTZ. Additionally, the network node may identify a link connected to a second network node that is also assigned the TTZ ID. In response to the command to initiate discovering the TTZ, the network node may generate a router information (RI) link-state advertisement (LSA) that comprises the TTZ ID and may distribute the RI LSA to the second network node using the link.

In another example embodiment, the disclosure includes a network node used to discover a TTZ. The network node may receive an RI LSA that comprises the TTZ ID from an input link. The network node may determine the network node is not designated as a TTZ edge node. Following the determination, the network node may store at least a portion of the information within the RI LSA and may flood the RI LSA using a plurality of links associated with the network node.

In yet another example embodiment, the disclosure includes a network node used to discover a TTZ. The network node may obtain a TTZ ID that is uniquely associated with the TTZ and may determine one or more links used to forward data to one or more adjacent nodes that are configured with the TTZ ID. In response to the command to initiate the discovery of the TTZ, the network node may generate an RI LSA comprising the TTZ ID and may transmit the RI LSA to the one or more adjacent nodes using the one or more links.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are various embodiments for discovering a TTZ. A plurality of network nodes may be used to construct a TTZ that increases the scalability of a network and minimizes service interruptions. A TTZ may be a plurality of network nodes configured to generate RI LSAs with the same TTZ ID and an identifier that indicates the network node is a TTZ edge node or a TTZ internal node. Links between the network nodes may have a TTZ edge node or a TTZ internal node as an end point. Constructing a TTZ is discussed in more detail in U.S. patent application Ser. No. 14/188,080 filed on Feb. 25, 2014 by Huaimo Chen et al., and entitled "Constructing a Topology-Transparent Zone," which is incorporated herein by reference as if reproduced in its entirety. A TTZ may automatically be discovered by using the network nodes along the edges of the TTZ and configuring at least one link associated with the network nodes along the edge of the TTZ as a TTZ link. The network nodes along the edges of the TTZ may generate and distribute RI LSAs to other network nodes of the TTZ via the TTZ link. The RI LSAs may be stored by each of the network nodes to compile information about the entire TTZ. An entire TTZ may be automatically discovered by configuring the network nodes along the edges of the TTZ to generate and distribute the information about the TTZ (e.g., RI LSAs), and thus reduces the number of manual configurations performed by a network administrator and/or operator.

Figure 1:
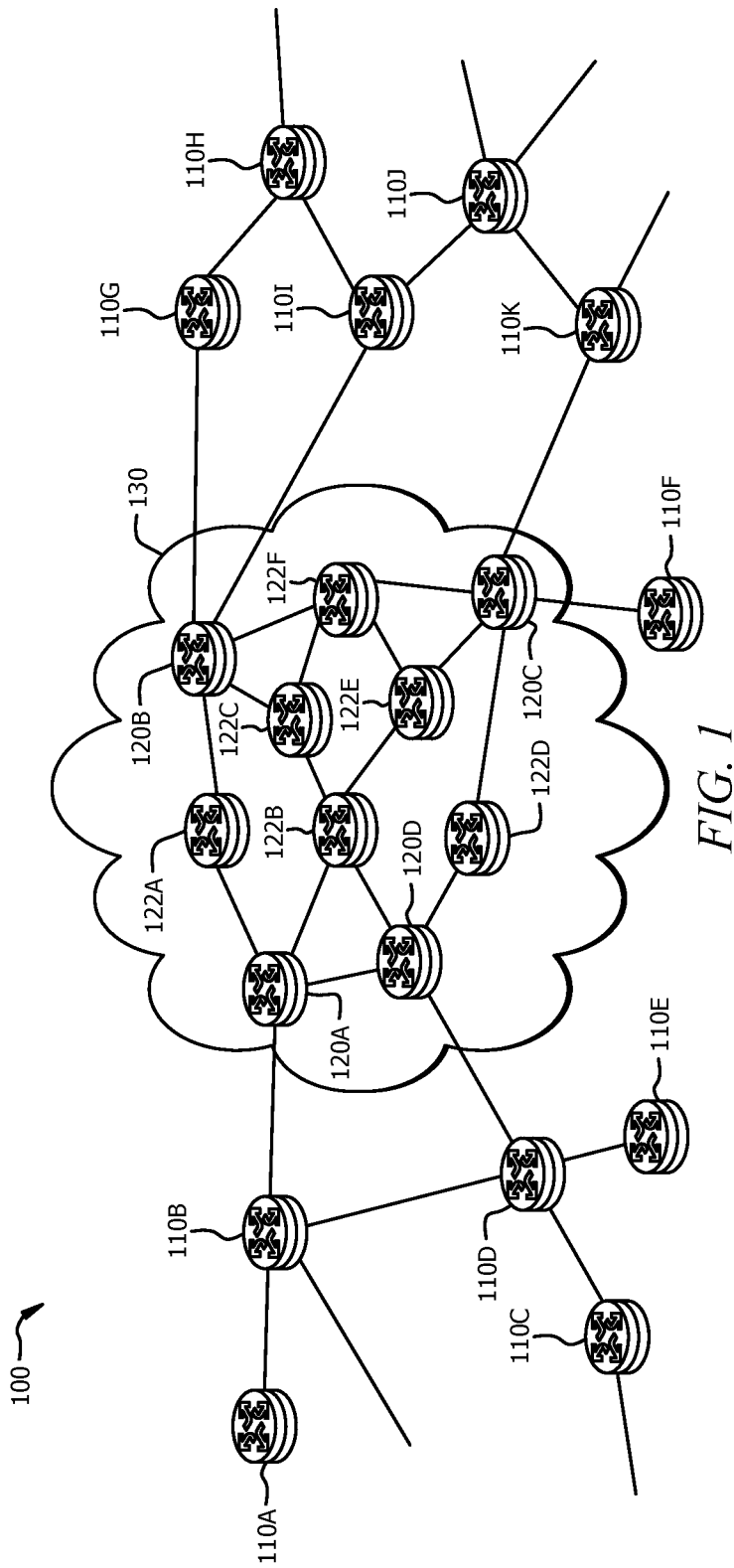
FIG. 1 is a schematic diagram of an example embodiment of a label switched system.

FIG. 1 is a schematic diagram of an example embodiment of a label switched system 100 where embodiments of the present disclosure may operate. The label switched system 100 comprises a plurality of network nodes 110A-110K and a TTZ 130 which comprises a plurality of TTZ edge nodes 120A-120D and a plurality of TTZ internal nodes 122A-122F. Additionally, the TTZ 130 may be configured as a virtualized network where network nodes 110A-110K located outside of the TTZ 130 are unaware of TTZ internal nodes 122A-122F and TTZ links within the TTZ 130. The TTZ links within TTZ 130 are not advertised to any network nodes outside of the TTZ. The implementation of one or more TTZs 130 may be effective in reducing link state distributions within a network and may be less complex for computing a path for an MPLS TE LSP crossing multiple TTZs. For example, LSPs may be computed without relying on intermediaries (e.g., a PCE). As such, the TTZ 130 may be configured to provide end to end service crossing the TTZ 130 such that network nodes 110A-110K outside of the TTZ 130 may interact with the TTZ 130, but are unaware of the topology or the construction of the TTZ 130.

In one example embodiment, a TTZ 130 may be a zone within an open shortest path first (OSPF) network or area in the label switched system 100. A network operator or centralized controller (e.g., a software-defined network (SDN) controller) may set up the TTZ edge nodes 120A-120D and/or the TTZ internal nodes 122A-122F. A TTZ edge node 120A-120D may be coupled to one or more network nodes 110A-110K located outside TTZ 130, one or more TTZ internal nodes 122A-122F, and/or one or more other TTZ edge nodes 120A-120D. A TTZ internal node 122A-122F may be coupled to one or more other TTZ internal nodes 122A-122F, and/or one or more TTZ edge nodes 120A-120D. A TTZ internal node 122A-122F may not be directly coupled to a network node outside of the TTZ 130, for example, network nodes 110A-110K. The TTZ edge node 120A-120D and the TTZ internal node 122A-122F may be configured to use a common TTZ ID, which may be a label that identifies TTZ 130.

A TTZ edge node and/or a TTZ internal node may form an adjacency with another TTZ edge node and/or a TTZ internal node using conventional methods, such as, the methods for establishing a connection between two conventional network nodes. A TTZ edge node may also form an adjacency with any network node outside of TTZ 130 (e.g., network nodes 110A-110K) that has a connection with the TTZ edge node. For example, the link-state database (LSDB) of the TTZ edge node may be synchronized with the network nodes 110A-110K outside of TTZ 130 by sending the network nodes 110A-110K outside of TTZ 130 information about all the LSAs except for the LSAs belonging to TTZ internal nodes 122A-122F and/or TTZ edge nodes 120A-120D which may be hidden from network nodes 110A-110K outside of TTZ 130.

The network nodes 110A-110K, the TTZ edge nodes 120A-120D, and the TTZ internal nodes 122A-122F may be coupled to one another via one or more links. The links discussed herein may be physical links, such as electrical and/or optical links, and/or logical links (e.g., virtual links) used to transport data. A link between two network nodes within the TTZ 130 (e.g., the TTZ edge nodes 120A-120D and/or the TTZ internal nodes 122A-122F) may be referred to as a TTZ link. A link between a network node within the TTZ 130 (e.g., the TTZ edge nodes 120A-120D) and a network node outside of the TTZ 130 (e.g., network nodes 110A-110K) may be referred to as a non-TTZ link.

In one example embodiment, the TTZ edge nodes 120A-120D may be set up by configuring a TTZ ID on each of the TTZ edge nodes 120A-120D and on each of the links between each of the TTZ edge nodes 120A-120D and other TTZ edge nodes 120A-120D and/or TTZ internal nodes 122A-122F. The TTZ internal nodes 122A-122F may be set up by configuring the TTZ ID on each of the TTZ internal nodes 122A-122F. Configuring the TTZ ID on each of the TTZ internal nodes 122A-122F may indicate that the TTZ internal nodes 122A-122F are TTZ internal nodes and the links associated with each of the TTZ internal nodes 122A-122F are TTZ links.

In another example embodiment, the TTZ edge nodes 120A-120D may be set up through configuring a TTZ ID on each of the TTZ edge nodes and on at least one link between each of the TTZ edge nodes and one of the other TTZ edge nodes 120A-120D and/or TTZ internal nodes 122A-122F within the TTZ 130; each of the TTZ internal nodes 122A-122F may be set up through receiving an RI LSA with TTZ type-length-value (TLV), which infers that the node receiving the RI LSA is a TTZ internal node 122A-122F and all its links are TTZ links. When one of the TTZ edge nodes 120A-120D receives an RI LSA with TTZ TLV from a link, this link is inferred as a TTZ link.

The network nodes 110A-110K, the TTZ edge nodes 120A-120D, and the TTZ internal nodes 122A-122F may be any devices or components that support the transportation of data traffic (e.g., data packets) through the label switched system 100. For example, the network nodes 110A-110K, the TTZ edge nodes 120A-120D, and the TTZ internal nodes 122A-122F may be switches, routers, gateways, servers, and any other suitable network device for communicating packets as would be appreciated by one of ordinary skill in the art upon viewing this disclosure, or combinations thereof. The network nodes 110A-110K, the TTZ edge nodes 120A-120D, and the TTZ internal nodes 122A-122F may be configured to receive data from other network nodes, to determine which network nodes to send the data to (e.g., via logic circuitry or a forwarding table), and/or to transmit the data to other network nodes. A TTZ edge node may be configured to operate as a conventional network node and also configured to generate and distribute information about TTZ 130 with other TTZ edge nodes 120A-120D and/or TTZ internal nodes 122A-122F.

In an example embodiment, the TTZ edge nodes 120A-120D and the TTZ internal nodes 122A-122F may be configured to generate an RI LSA comprising a TTZ TLV. For example, a TTZ edge node (e.g., TTZ edge node 120A) may generate an RI LSA comprising a TTZ TLV indicating the TTZ edge node is a TTZ edge node and a TTZ ID for the TTZ 130. The TTZ ID may be a numeric value, such as 100, that identifies TTZ 130. A TTZ internal node (e.g., TTZ internal node 122A) may generate an RI LSA comprising a TTZ TLV that indicates the TTZ internal node is a TTZ internal node and a TTZ ID (e.g., 100) for TTZ 130. The TTZ edge nodes 120A-120D and the TTZ internal nodes 122A-122F may be configured to flood the RI LSA to other TTZ edge nodes (e.g., TTZ edge nodes 120A-120D) and/or to other TTZ internal nodes (e.g., TTZ internal nodes 122A-122F). For example, the TTZ edge nodes 120A-120D and the TTZ internal nodes 122A-122F may send the RI LSAs via the TTZ links. The TTZ edge node 120A-120D may not send the RI LSAs via non-TTZ links.

The TTZ edge nodes 120A-120D and the TTZ internal nodes 122A-122F may also be configured to receive a plurality of RI LSAs comprising a TTZ TLV from other TTZ edge nodes 120A-120D and/or other TTZ internal nodes 122A-122F. After receiving the RI LSAs, the TTZ edge nodes 120A-120D and the TTZ internal nodes 122A-122F may be configured to store information pertaining to the RI LSAs. For example, after receiving an RI LSA comprising a TTZ TLV with a TTZ ID, the RI LSA information may be stored into a LSDB. The RI LSA information stored within the LSDB may include, but is not limited to, the advertising node, the node type (e.g., TTZ edge node or TTZ internal node), and the TTZ ID. Once receiving and/or storing the RI LSA information, the TTZ edge nodes 120A-120D and the TTZ internal nodes 122A-122F may flood the RI LSA to other TTZ edge nodes 120A-120D and/or other TTZ internal nodes 122A-122F over the TTZ links.

The topology of a TTZ such as TTZ 130 may be determined by receiving and storing RI LSAs and conventional LSAs. For example, the topology of the TTZ may be represented by all the conventional LSAs stored in the TTZ edge nodes 120A-120D and/or the TTZ internal nodes 122A-122F. In such an example, each of the conventional LSAs may comprise the same advertising network node as one of the RI LSAs stored in the TTZ edge nodes 120A-120D and/or the TTZ internal nodes 122A-122F.

Figure 2:
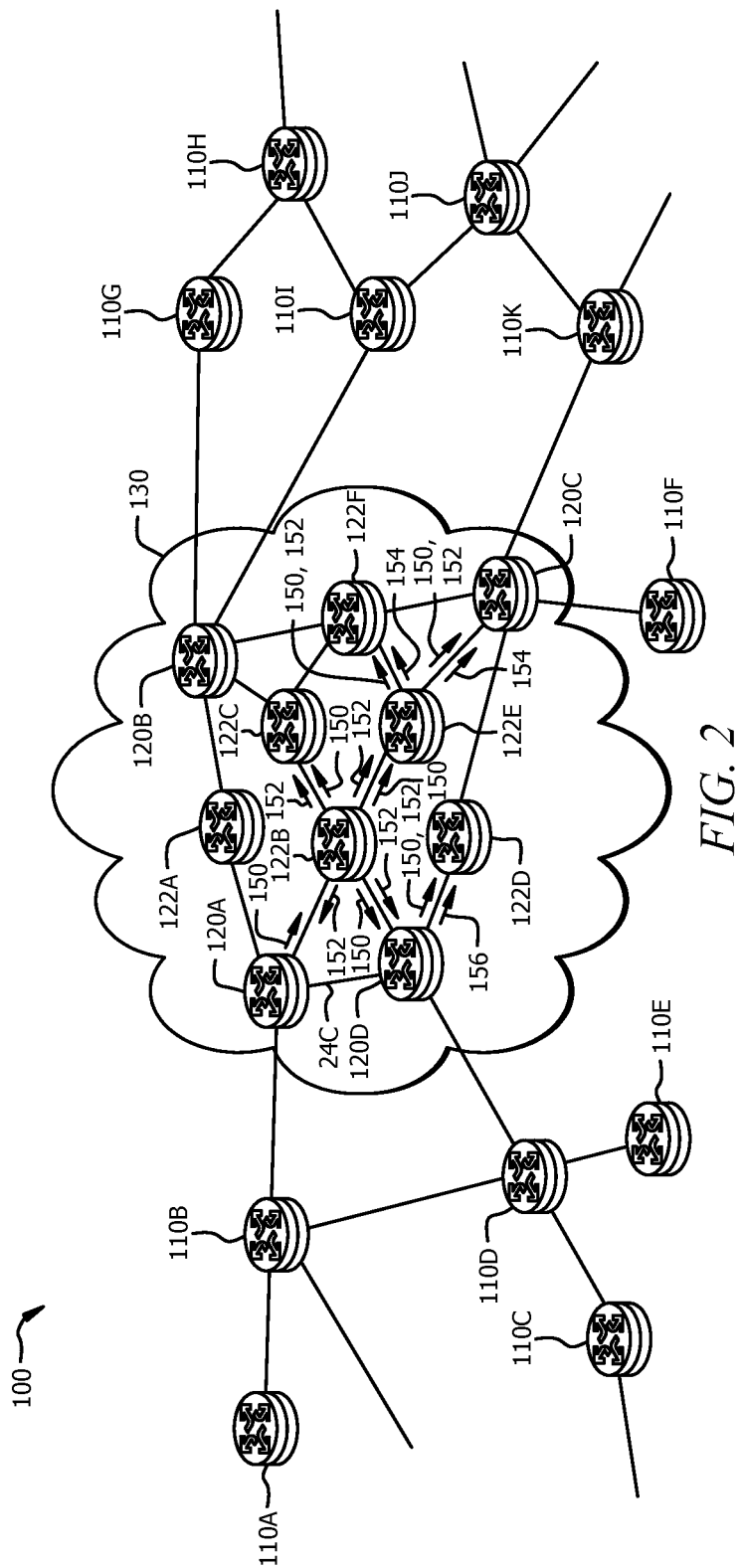
FIG. 2 is a schematic diagram of an example embodiment of a label switched system configured to discover a topology-transparent zone.

FIG. 2 is a schematic diagram of an example embodiment of the label switched system 100 configured to discover TTZ 130. In one example embodiment, a network administrator and/or operator may determine if the TTZ edge nodes 120A-120D and/or the TTZ internal nodes 122A-122F are in a suitable condition and/or ready to operate as TTZ edge nodes 120A-120D and/or the TTZ internal nodes 122A-122F. For example, TTZ edge nodes 120A-120D and/or TTZ internal nodes 122A-122F may be ready upon receiving all the necessary information (e.g., LSAs) from all the other TTZ edge nodes 120A-120D and/or TTZ internal nodes 122A-122F within TTZ 130. The status of TTZ edge node 120-120D and/or TTZ internal node 122A-122F may be available to the network administrator and/or operator using a display command.

Each of the TTZ edge nodes 120A-120D may be configured with the TTZ ID (e.g., 100) that identifies the TTZ 130 and one or more TTZ links used to connect to other TTZ edge nodes 120A-120D and/or TTZ internal nodes 122A-122F. For example, the TTZ edge node 120A may be configured with the TTZ ID for the TTZ 130 and with a TTZ link between the TTZ edge node 120A and the TTZ internal node 122B. As needed, additional TTZ links may be configured to other TTZ edge nodes and/or TTZ internal nodes to improve the likelihood of discovering other TTZ edge nodes and/or TTZ internal nodes. The TTZ edge nodes 120A-120D and the TTZ internal nodes 122A-122F may learn and/or identify TTZ links and other TTZ edge nodes 120A-120D and/or the TTZ internal nodes 122A-122F by sharing RI LSAs comprising a TTZ TLV within the TTZ 130. For example, in response to receiving an RI LSA, TTZ edge nodes 120A-120D and/or the TTZ internal nodes 122A-122F may infer the sender is a TTZ edge node and/or a TTZ internal node and the link used to receive the RI LSA is a TTZ link. In one example embodiment, a network administrator and/or operator may initially configure each TTZ edge node 120A-120D and one or more TTZ links prior to the TTZ discovery.

After configuring the TTZ, the TTZ edge nodes 120A-120D may receive a command to initiate the TTZ discovery scheme. In one example embodiment, the command to initiate the TTZ discovery scheme may be a triggering command from a network administrator and/or operator or from a centralized controller (e.g., an SDN controller). For example, the triggering command may be a direct command, such as, a command-line interface (CLI) command, or an activation signal, such as, a signal from a timer which activates the TTZ once the timer has expired. In response to receiving the command to initiate the TTZ discovery, the TTZ edge nodes 120A-120D may generate the RI LSA. The TTZ edge nodes 120A-120D may use the TTZ links to send the RI LSA to other TTZ edge nodes 102A-120D and/or TTZ internal nodes 122A-122F. The RI LSA comprising the TTZ TLV may not be communicated to network nodes located outside of TTZ 130, nor sent using non-TTZ links, and/or using undiscovered TTZ links. For example, the TTZ edge node 120A may receive a triggering command from a network operator, may generate an RI LSA 150 comprising a TTZ TLV, and may send the RI LSA 150 to the TTZ internal node 122B using a TTZ link. RI LSA 150 may be configured with the TTZ ID for the TTZ 130 and an identifier to indicate that TTZ edge node 120A is a TTZ edge node. Although the link between TTZ edge node 120A and TTZ internal node 122A is a TTZ link, TTZ edge node 120A has not discovered the link as a TTZ link. As such, RI LSA 150 is not sent to TTZ internal node 122A.

The TTZ edge nodes 120A-120D and the TTZ internal nodes 122A-122F may receive an RI LSA comprising a TTZ TLV and subsequently, to store at least a portion of the information from the RI LSA and send the RI LSA to other TTZ edge nodes 120A-120D and/or TTZ internal nodes 122A-122F. For example, the TTZ internal node 122B may receive the RI LSA 150. The TTZ internal node 122B may store information from the RI LSA 150 (e.g., into an LSDB) and may flood the received RI LSA 150 to other TTZ edge nodes 120A-120D and/or TTZ internal nodes 122A-122F using the TTZ links of the TTZ internal node 122B. The internal node 122B may also generate an RI LSA 152 and send the RI LSA 152 using the TTZ links of the TTZ internal node 122B. RI LSA 152 may be configured with the TTZ ID for the TTZ 130 and an identifier to indicate that TTZ internal node 122B is a TTZ internal node. The TTZ ID may be set using the TTZ ID of a previously received RI LSA (e.g., RI LSA 150). The TTZ internal node 122E may receive RI LSA 150 and RI LSA 152, may store RI LSA 150 and RI LSA 152, may generate an RI LSA 154, and may flood RI LSA 150, RI LSA 152, and RI LSA 154 using TTZ links of the TTZ internal node 122E. RI LSA 154 may be configured with the TTZ ID for the TTZ 130 and an identifier to indicate that TTZ internal node 122E is a TTZ internal node. The TTZ edge node 120D may receive RI LSA 150 and RI LSA 152, may store RI LSA 150 and RI LSA 152, may generate an RI LSA 156, and may flood RI LSA 150, RI LSA 152, and RI LSA 156 using the TTZ links of the TTZ edge node 120D. RI LSA 156 may be configured with the TTZ ID for the TTZ 130 and an identifier to indicate that TTZ edge node 120D is a TTZ edge node. The process of generating and sharing RI LSAs may be repeated until all of the TTZ links, TTZ edge nodes 120A-120D, and/or TTZ internal nodes 122A-122F are discovered.

Additionally, the TTZ edge nodes 120A-120D and the TTZ internal nodes 122A-122F may be configured to display TTZ information in response to receiving a display command. The display command may be a command from a network administrator and/or operator or from a centralized controller (e.g., an SDN controller) requesting TTZ information. In response to receiving the display command, the TTZ edge nodes 120A-120D and/or the TTZ internal nodes 122A-122F may display and/or identify the discovered network nodes (e.g., TTZ edge nodes 120A-120D and the TTZ internal nodes 122A-122F) and/or the TTZ links within the TTZ 130. The TTZ information may be used for verification purposes by the network administrator and/or operator or the centralized controller. For example, the TTZ information may be used to verify that all network nodes within the TTZ 130 have been discovered.

Figure 3:
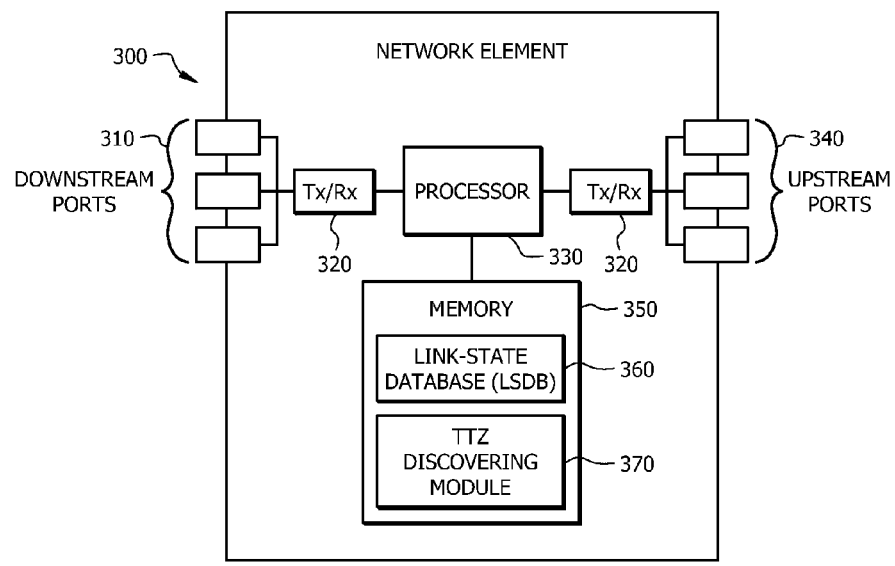
FIG. 3 is a schematic diagram of an example embodiment of a network element.

FIG. 3 is a schematic view of an embodiment of a network element 300 that may be used to transport and process data traffic through a network or a label switched system 100 shown in FIG. 1. At least some of the features/methods described in the disclosure may be implemented in a network element. For instance, the features/methods of the disclosure may be implemented in hardware, firmware, and/or software installed to run on the hardware. The network element may be any device (e.g., a switch, router, bridge, server, client, etc.) that transports data through a network, system, and/or domain. Moreover, the terms network "element," "node," "component," "module," and/or similar terms may be interchangeably used to generally describe a network device and do not have a particular or special meaning unless otherwise specifically stated and/or claimed within the disclosure. In one example embodiment, the network element 300 may be an apparatus used to generate and communicate an RI LSA, to store an RI LSA, to display TTZ information, to process data traffic, and/or to communicate data traffic. For example, network element 300 may be a TTZ edge node 120A-120D and/or a TTZ internal node 122A-122F as described in FIG. 1.

The network element 300 may comprise one or more downstream ports 310 coupled to a transceiver (Tx/Rx) 320, which may be transmitters, receivers, or combinations thereof. The Tx/Rx 320 may transmit and/or receive frames from other network nodes via the downstream ports 310. Similarly, the network element 300 may comprise another Tx/Rx 320 coupled to a plurality of upstream ports 340, wherein the Tx/Rx 320 may transmit and/or receive frames from other nodes via the upstream ports 340. The downstream ports 310 and/or the upstream ports 340 may include electrical and/or optical transmitting and/or receiving components.

A processor 330 may be coupled to the Tx/Rx 320 and may be configured to process the frames and/or determine which nodes to send (e.g., transmit) the frames. In an example embodiment, processor 330 may comprise one or more multi-core processors and/or memory modules 350, which may function as data stores, buffers, etc. The processor 330 may be implemented as a general processor or may be part of one or more application specific integrated circuits (ASICs), field-programmable gate arrays (FPGAs), and/or digital signal processors (DSPs). Although illustrated as a single processor, the processor 330 is not so limited and may comprise multiple processors. The processor 330 may be configured to implement any of the schemes described herein, including method 600 and method 700 as described in FIGS. 6 and 7, respectively.

FIG. 3 illustrates that a memory module 350 may be coupled to the processor 330 and may be a non-transitory medium configured to store various types of data. Memory module 350 may comprise memory devices including secondary storage, read-only memory (ROM), and random-access memory (RAM). The secondary storage is typically comprised of one or more disk drives, optical drives, solid-state drives (SSDs) and/or tape drives and is used for non-volatile storage of data and as an over-flow storage device if the RAM is not large enough to hold all working data. The secondary storage may be used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and RAM is typically faster than to the secondary storage.

The memory module 350 may be used to house the instructions for carrying out the system and methods described herein (e.g., as a network node). In an example embodiment, the memory module 350 may comprise one or more LSDBs 360 and/or a TTZ discovering module 370 that may be implemented on the processor 330. Alternatively, the TTZ discovering module 370 may be implemented directly on the processor 330. The LSDB 360 may be configured to store RI LSA information. The TTZ discovering module 370 may be configured to generate and communicate RI LSAs to compile information about a TTZ and/or to discover a TTZ. In one example embodiment, the TTZ discovering module 370 may be located on a TTZ internal node and may be used to implement method 700 as described in FIG. 7. In another example embodiment, the TTZ discovering module 370 may be located on a TTZ edge node and may be used to implement method 600 as described in FIG. 6.

It is understood that by programming and/or loading executable instructions onto the network element 300, at least one of the processor 330, the cache, and the long-term storage are changed, transforming the network element 300 in part into a particular machine or apparatus, for example, a multi-core forwarding architecture having the novel functionality taught by the present disclosure. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and number of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable will be produced in large volume may be preferred to be implemented in hardware (e.g., in an ASIC) because for large production runs the hardware implementation may be less expensive than software implementations. Often a design may be developed and tested in a software form and then later transformed, by well-known design rules known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 4:
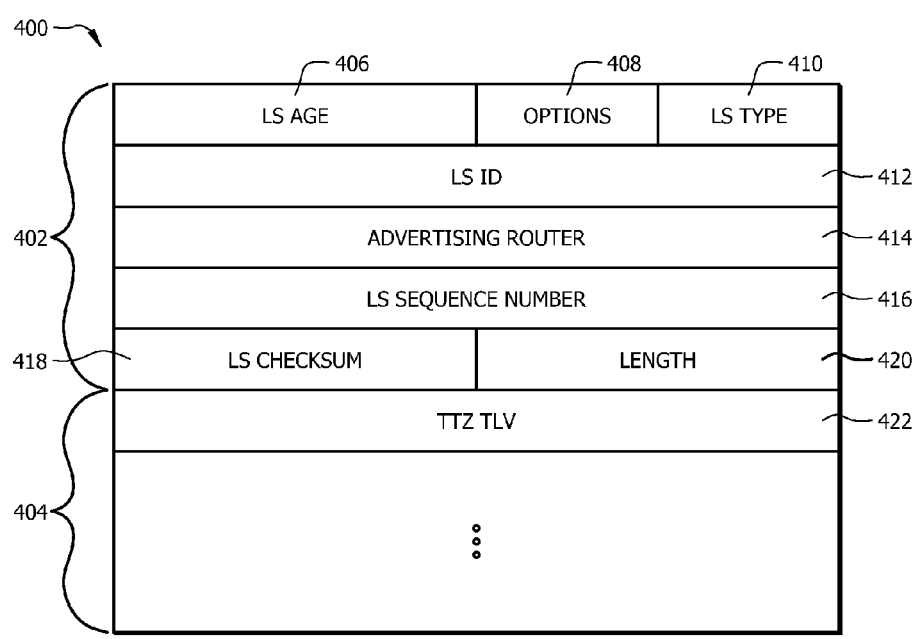
FIG. 4 is an example embodiment of a router information link-state advertisement frame.

FIG. 4 is an example embodiment of an RI LSA frame 400. In an example embodiment, the RI LSA frame 400 may be configured to describe and/or to communicate information about a network node within a TTZ. For example, an RI LSA frame 400 may describe a TTZ edge node (e.g., TTZ edge nodes 120A-120D as described in FIG. 1) or a TTZ internal node (e.g., TTZ internal nodes 122A-122F as described in FIG. 1) associated with the TTZ. RI LSA frame 400 comprises a header portion 402 and a TTZ TLV portion 404. The header portion 402 comprises a link-state (LS) age field 406, an options field 408, an LS type field 410, an LS ID field 412, an advertising router field 414, an LS sequence number field 416, an LS checksum field 418, and a length field 420. The LS age field 406 may be about 16 bits and may indicate a time (e.g., in seconds) since the LS originated. The options field 408 may be about eight bits and may indicate one or more optional capabilities supported by the corresponding portion of the routing domain. The LS type field 410 may be about eight bits and may indicate a type of LSA, for example, a link scoped Opaque-LSA, an area-scoped Opaque-LSA, or an AS-scoped LSA. The LS ID field 412 may be about 32 bits and may comprise an eight bit Opaque type and a 24 bit Opaque ID. In one example embodiment, the Opaque type may have a value of four and the Opaque ID may have a value of zero. The advertising router field 414 may be about 32 bits and may identify the network node advertising the LSA. The LS sequence number field 416 may be about 32 bits and may indicate an instance of an LSA. The LS checksum field 418 may be about 16 bits and may comprise a checksum (e.g., a Fletcher checksum) of the complete contents of the LSA. The length field 420 may be about 16 bits and may indicate the length (e.g., in bytes) of the LSA. The TTZ TLV portion 404 comprises one or more TTZ TLVs 422. The TTZ TLV 422 may describe a TTZ node configuration, as will be discussed in FIG. 5.

Alternatively, an RI LSA frame may be a conventional Router LSA frame configured such that the existing type field for a router link may be split into two fields. For example, the type field may comprise a flag field and a new type field. The flag field may be about one bit and may indicate that the router link is a TTZ link or a non-TTZ link. For example, the flag field may have a first value (e.g., a value of one) to indicate the router link is a TTZ link and a second value (e.g., a value of zero) to indicate the router link is a non-TTZ link. The new type field may be about seven bits and may indicate the kind of link. For example, the new type field may indicate the link is a point-to-point connection to another router, a connection to a transit network, a connection to a stub network, or a virtual link.

Figure 5:
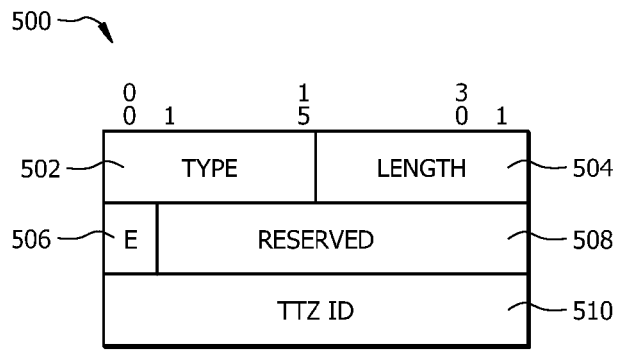
FIG. 5 is an example embodiment of a topology-transparent zone type-length-value frame.

FIG. 5 is an example embodiment of a TTZ TLV frame 500. In one example embodiment, the TTZ TLV frame 500 may be configured to describe a TTZ network node configuration. The TTZ TLV frame 550 comprises a type field 502, a length field 504, an e-bit field 506, a reserved field 508, and a TTZ ID field 510. The type field 502 may be about 16 bits and may indicate the type of TLV. For example, the type field 502 may be set to two, which may indicate the TLV is a TTZ TLV. Additionally, the type field 502 may be set to a value determined by the Internet Assigned Numbers Authority (LANA). The length field 504 may be about 16 bits and may indicate the length (e.g., in bytes) of the TTZ TLV frame 500. The e-bit field 506 may be one bit and may indicate the type (e.g., a TTZ edge node or a TTZ internal node) of TTZ node. For example, the e-bit field 506 may be set to a first value (e.g., set to zero) to indicate a TTZ internal node or may be set to a second value (e.g., set to one) to indicate a TTZ edge node. The reserved field 508 may be about 31 bits and may be reserved for later use. The TTZ ID field 510 may be 32 bits and may identify a TTZ (e.g., a group of TTZ network nodes).

Figure 6:
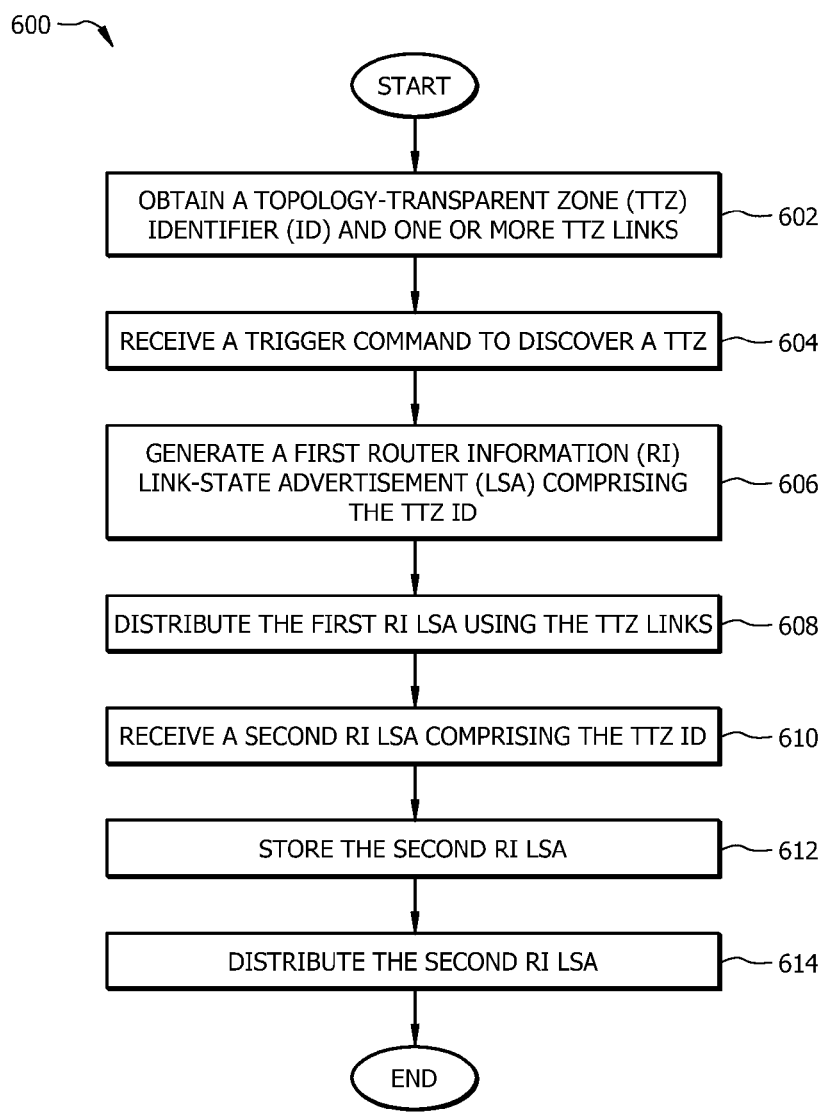
FIG. 6 is a flowchart of an example embodiment of a topology-transparent zone discovering method.

FIG. 6 is a flowchart of an example embodiment of a TTZ discovering method 600. In an example embodiment, a TTZ edge node (e.g., TTZ edge node 120A-120D as shown in FIG. 1) may be configured to employ method 600 to operate within a TTZ. At step 602, method 600 may obtain a TTZ ID and one or more TTZ links. For example, a TTZ edge node may be configured with a TTZ ID and one or more TTZ links by a network administrator and/or operator. The TTZ ID may be a common ID unique to the TTZ and may be assigned to all network nodes and links located within the TTZ. At step 604, method 600 may receive a trigger command to discover a TTZ. Method 600 may receive a triggering command from a network administrator and/or operator to discover the TTZ. At step 606, method 600 may generate an RI LSA comprising a TTZ ID in response to receiving the triggering command. Method 600 may generate an RI LSA, such as RI LSA frame 400 as described in FIG. 4. The RI LSA may comprise a TTZ TLV, such as TTZ TLV frame 500 as described in FIG. 5. Method 600 may generate a TTZ TLV such that the e-bit field has a value of one indicating the network node is a TTZ edge node and the TTZ ID field is set to the TTZ ID associated with the TTZ. At step 608, method 600 may distribute the RI LSA using the TTZ links. Method 600 may send the RI LSA to other network nodes using the TTZ links configured for the network node. The RI LSA is not sent on other links, such as, non-TTZ links or undiscovered TTZ links.

At step 610, method 600 may receive an RI LSA comprising the TTZ ID. Method 600 may receive an RI LSA comprising the TTZ ID from one or more TTZ edge nodes and/or TTZ internal nodes in the TTZ. Method 600 may infer or learn that a link to a TTZ edge node and/or TTZ internal node is a TTZ link, in response to receiving the RI LSA comprising the TTZ ID on the link. At step 612, method 600 may store the RI LSA. Method 600 may store the RI LSA information for the TTZ edge node and/or the TTZ internal node in the TTZ edge node (e.g., in an LSDB). For example, method 600 may store the identity of the transmitting or advertising network node, the transmitting network node type (e.g., TTZ edge node or TTZ internal node), and/or the identity of the receiving link as a TTZ link. At step 614, method 600 may distribute the RI LSA. Method 600 may send the received RI LSA comprising the TTZ TLV to other TTZ edge nodes and/or TTZ internal nodes in the TTZ. Method 600 may send the RI LSA to other TTZ edge nodes and/or TTZ internal nodes using the TTZ links of the network node. For example, method 600 may send the RI LSA using TTZ links established by a network operator and/or TTZ links learned by receiving an RI LSA comprising a TTZ TLV from other TTZ edge nodes and/or TTZ internal nodes. Method 600 may not send information about TTZ links using the RI LSA to other network nodes outside of the TTZ.

Figure 7:
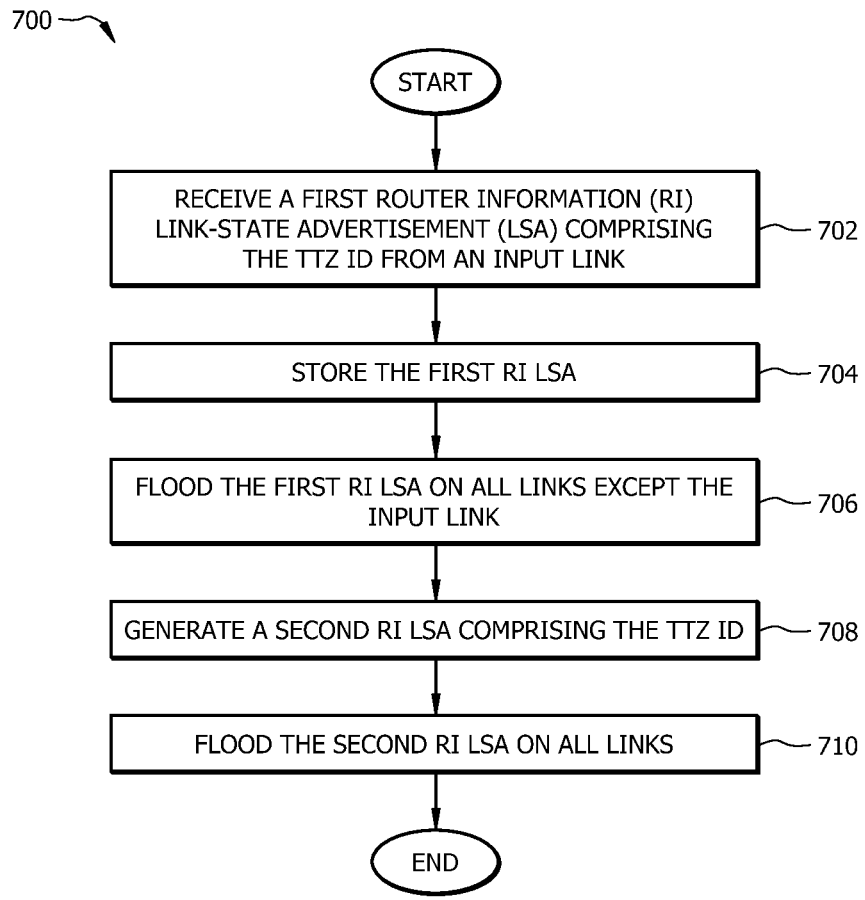
FIG. 7 is a flowchart of another example embodiment of a topology-transparent zone discovering method.

FIG. 7 is a flowchart of another example embodiment of a TTZ discovering method 700. In an example embodiment, a TTZ internal node (e.g., TTZ internal node 122A-122F as shown in FIG. 1) may be configured to employ method 700 to operate within a TTZ. At step 702, method 700 may receive an RI LSA comprising a TTZ ID from an input link. Method 700 may receive an RI LSA comprising the TTZ ID from TTZ edge nodes and/or TTZ internal nodes in the TTZ. Method 700 may infer or learn that the link to the TTZ edge node and/or TTZ internal node is a TTZ link, in response to receiving the RI LSA comprising the TTZ ID on the link. At step 704, method 700 may store the RI LSA. Method 700 may store the RI LSA information for the TTZ edge node and/or the TTZ internal node in the TTZ internal node (e.g., in an LSDB). For example, method 700 may store the identity of the transmitting or advertising network node, the transmitting network node type (e.g., TTZ edge node or TTZ internal node), and/or the identity of the receiving link as a TTZ link. At step 706, method 700 may flood the RI LSA on all links except the input link. Method 700 may send the received RI LSA comprising the TTZ TLV to other TTZ edge nodes and/or TTZ internal nodes within the TTZ. Method 700 may determine the receiving network node is not a TTZ edge node and may transmit the RI LSA to other TTZ edge nodes and/or TTZ internal nodes within the TTZ using all of the links of the network node except the input link.

At step 708, method 700 may generate a second RI LSA comprising the TTZ ID. Method 700 may generate an RI LSA, such as RI LSA frame 400 as described in FIG. 4. The RI LSA may comprise a TTZ TLV, such as TTZ TLV frame 500 as described in FIG. 5. Method 700 may generate a TTZ TLV such that the e-bit field has a value of zero indicating the network node is a TTZ internal node and the TTZ ID field is set to the TTZ ID associated with the TTZ. For example, the TTZ ID may be set using the TTZ ID from a previously received RI LSA. At step 710, method 700 may flood the RI LSA on all links. Method 700 may transmit the generated RI LSA to other TTZ edge nodes and/or TTZ internal nodes within the TTZ using all of the links of the network node.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, ... 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed. The use of the term about means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. All documents described herein are incorporated herein by reference.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

We claim:

1. In a network component, a method for discovering a topology-transparent zone (TTZ), the method comprising:
   obtaining a TTZ identifier (ID) that is uniquely associated with the TTZ;
   identifying the network component as an edge node of the TTZ;
   identifying any links between the network component and any connected edge nodes of the TTZ as TTZ links;
   identifying a link connected to a second network component that is assigned the TTZ ID, wherein the second network component is an internal node of the TTZ;
   receiving a triggering command to initiate discovering the TTZ;
   generating a router information (RI) link-state advertisement (LSA) comprising a first field that indicates the TTZ ID in response to receiving the triggering command; and
   distributing the RI LSA using the link,
   wherein the TTZ is a zone within an area that is part of a network.

2. The method of claim 1, further comprising receiving a second RI LSA that comprises the TTZ ID from a second link.

3. The method of claim 2, further comprising storing at least a portion of information within the second RI LSA into a link-state database (LSDB).

4. The method of claim 3, wherein the at least a portion of the information comprises an identifier for an advertising network component and a network component type for the advertising network component.

5. The method of claim 2, further comprising storing an identifier for the second link into a link-state database (LSDB) as a TTZ link.

6. The method of claim 2, further comprising sending the second RI LSA using the link.

7. The method of claim 1, wherein the RI LSA is not advertised to any network nodes outside of the TTZ.

8. The method of claim 1, wherein the RI LSA further comprises a second field that indicates that the network component is a TTZ edge node.

9. The method of claim 1, further comprising:
   receiving a request for TTZ information; and
   displaying a plurality of network components assigned the TTZ ID and a plurality of TTZ links in response to the request.

10. The method of claim 1, wherein the network component is configured to operate in a first mode and a second mode, wherein in the first mode the network component is not configured to operate as a TTZ edge node or a TTZ internal node, and wherein in the second mode the network component is configured as a TTZ edge node.

11. The method of claim 1, further comprising determining the network component is ready to operate as a TTZ edge node.

12. A network component comprising:
   a receiver configured to:
      receive a router information (RI) link-state advertisement (LSA) comprising a first field that indicates a topology-transparent zone (TTZ) identifier (ID) via an input link;
   a processor coupled to a memory and the receiver, wherein the memory comprises computer executable instructions stored on a non-transitory computer readable medium such that when executed by the processor causes the processor to:
  determine the network component is not designated as a TTZ edge node; and
  store at least a portion of information within the RI LSA; and
a transmitter coupled to the processor, wherein the transmitter is configured to flood the RI LSA via a plurality of links associated with the network component except the input link,
wherein the TTZ is a zone within an area of a network.

13. The network component of claim 12, wherein the computer executable instructions when executed by the processor cause the network component to generate a second RI LSA that comprises the TTZ ID.

14. The network component of claim 13, wherein the computer executable instructions when executed by the processor cause the network component to flood the second RI LSA via the plurality of links and the input link.

15. The network component of claim 13, wherein the second RI LSA indicates that the network component is a TTZ internal node.

16. The network component of claim 12, wherein storing the at least the portion of the information within the RI LSA comprises storing an identifier for a transmitting network component and a network component type for the transmitting network component.

17. A method for discovering a topology-transparent zone (TTZ) of a plurality of network components, the method comprising:
  identifying a plurality of edge nodes of the TTZ;
  assigning a TTZ identifier (ID) to each edge node of the plurality of edge nodes;
  identifying all TTZ links between the plurality of edge nodes;
  identifying at least one TTZ link from an edge node of the plurality of edge nodes to an internal node of the TTZ;
  generating a router information (RI) link-state advertisement (LSA) comprising a first field that indicates the TTZ ID;
  distributing the RI LSA on the at least one TTZ link from the edge node;
  receiving, at a node of the TTZ, the RI LSA with the TTZ ID;
  determining, when the node is not an edge node, the node is an internal node and all links to the node are TTZ links; and
  distributing, by the internal node, the RI LSA on all the links from the internal node except a TTZ link from which the internal node received the RI LSA.

18. The method of claim 17, further comprising receiving a triggering command to initiate discovering the TTZ.

19. The method of claim 17, further comprising receiving, at a second edge node of the plurality of edge nodes, the RI LSA with the TTZ ID, and determining that the link from which the RI LSA is received is a TTZ link when the receiving link is not previously determined as a TTZ link.

* * * * *